C. M. DAVIS.
COASTER BRAKE.
APPLICATION FILED AUG. 4, 1921.
1,402,577. Patented Jan. 3, 1922.
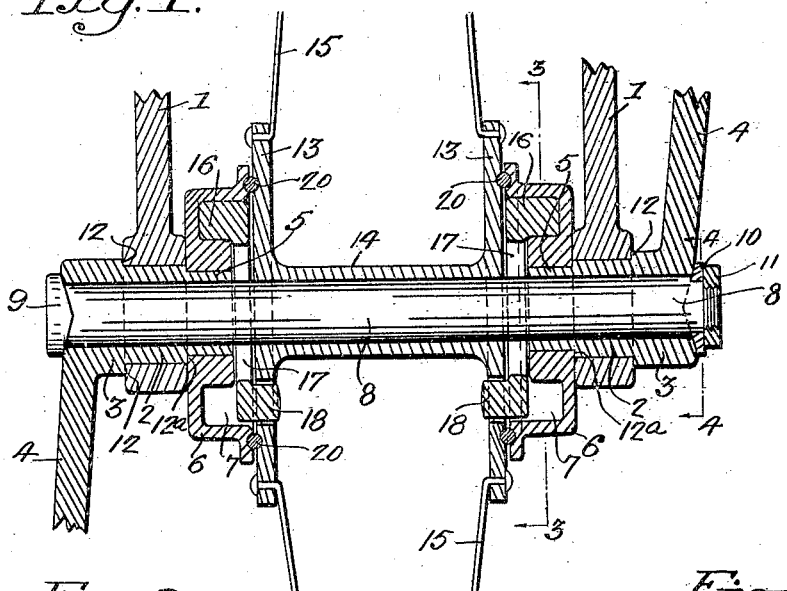
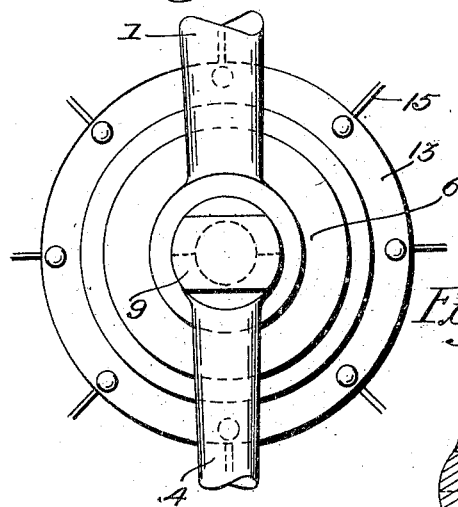
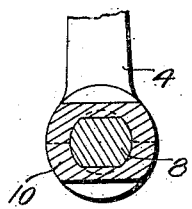
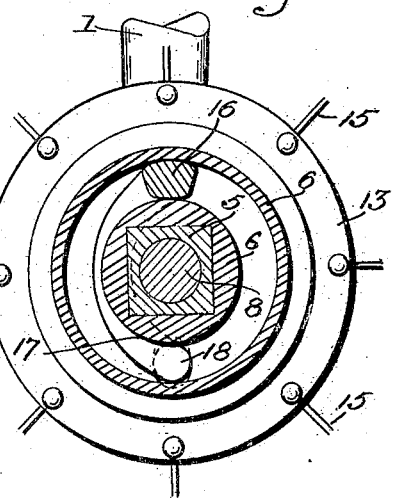
Inventor:
Clarence M. Davis.
by his Attorneys.
Howson & Howson

UNITED STATES PATENT OFFICE.

CLARENCE M. DAVIS, OF CAPE MAY, NEW JERSEY, ASSIGNOR TO A. MECKY COMPANY, OF PHILADELPHIA, PENNSYLVANIA, A CORPORATION OF PENNSYLVANIA.

COASTER BRAKE.

1,402,577.　　　　　　Specification of Letters Patent.　　Patented Jan. 3, 1922.

Application filed August 4, 1921. Serial No. 489,719.

*To all whom it may concern:*

Be it known that I, CLARENCE M. DAVIS, a citizen of the United States, residing in Cape May city, New Jersey, have invented Coaster Brakes, of which the following is a specification.

One object of my invention is to provide a relatively simple, substantial and inexpensive form of coaster brake particularly adapted for use on bicycles, velocipedes, tricycles and other similar vehicles, which shall be adapted to permit the forward driving of a wheel, shall allow coasting and shall include means whereby a braking force may be applied to the wheel or the latter may be driven backward at will.

I further desire to provide a form of coaster brake which shall utilize the fork of a vehicle as a part of a device for controlling the application of a braking force to a rotary member such as a wheel.

Another object of my invention is to provide a coaster brake for a vehicle such as a bicycle or velocipede, which shall include a novel means for utilizing the pedal cranks and their associated crank shaft or spindle as part of the braking mechanism for retarding or preventing rotation of the wheel.

These and other advantageous ends I secure as hereinafter set forth, reference being had to the accompanying drawings, in which, Fig. 1 is a longitudinal vertical section taken through a coaster brake constructed in accordance with my invention;

Fig. 2 is a side elevation of the structure shown in Fig. 1; and

Figs. 3 and 4 are vertical sections taken respectively on lines 3—3 and 4—4, Fig. 1.

In the above drawings, 1—1 represents the lower ends of the fork of a vehicle such as a bicycle or velocipede, which are connected at the upper ends in such manner and are made of such material that they are more or less springy and free to move toward or from each other to a limited extent. Each of these fork branches 1 is formed to provide a bearing for the cylindrical portion 2 of a tubular crank spindle 3, in the present instance formed integral with a crank arm 4 carrying at its outer or free end a pedal, which as it forms no part of the present invention, has not been illustrated. Each of said tubular spindles 3 has its inner end 5 squared or otherwise formed with a polygonal outline and on this polygonal end is mounted a clutch member 6 in the form of a short cylinder having an annular recess 7 concentric with the crank spindles 3. Said members abut upon shoulders 12ᵃ between the parts 2 and 5 of said spindles, which have extending axially through them a shaft or spindle 8 having a head 9 on one end and a plate or washer 10 held non-rotatably to the opposite end by a nut 11. The faces of the head and of the nut adjacent the ends of the crank spindles 3 are each formed in two parts at an obtuse angle to each other and constitute cams which coact with similarly formed angular depressions in the ends of said spindles. These are slidable on the shaft 8 and, as hereafter set forth, are free to turn thereon to a limited extent.

The outer ends of the crank spindles immediately adjacent the outer faces of the bearing portions of the fork branches 1 have shoulders 12 which press against said branches and force them toward each other, when owing to their coaction with the cam faces of the head 9 and nut 10, said crank spindles are moved toward each other. The fork branches 1, as well as the clutch members 6, are both longitudinally slidable upon their respective crank spindles and each of said clutch members has a flat inner face designed to frictionally engage the adjacent flat outer face of the flange 13 of a wheel hub 14. This is rotatably mounted on the shaft 8 between said members, and its flanges 13 serve for the attachment of the inner ends of spokes 15 whose outer ends are connected to or associated with the rim of the wheel in any desired manner forming no part of the present invention.

In each of the annular recesses 7 of the clutch members 6 is mounted a second clutch member in the form of a cam block 16 forming part of or connected to a curved arm 17 lying between the hub of the clutch member 6 and the hub flange 13 and terminating in a transversely projecting lug 18 more or less loosely extending into a hole formed in said flange about 180° distant from said cam 16. The latter is so formed that when the pedal cranks 4 are turned in a clockwise direction, the clutch members 6 are likewise turned and the arms 17 with said cams are caused to swing on the lugs 18 as pivots whereupon they frictionally grip or jam between the inner and outer walls of their recesses 7, thus connecting said clutch members to the hub flanges 13 so that the wheel is likewise turned in a clockwise direction.

If the pedal cranks 4 are no longer positively turned but are allowed to remain idle, the continued forward movement of the wheel with the hub 14 acts on the lugs 18 and arms 17 to free the cams 16 from gripping engagement with the clutch members 6, so that the wheel, and therefore the vehicle of which it forms a part, is free to drift or coast independently of the pedal cranks.

If now one of these latter is held while the other is turned backwardly, the cam faces of the head 9 and nut 10 coact with the adjacent portions of the crank spindle ends so that these are moved toward each other and move together the lower ends of the fork branches 1 as well as force the adjacent clutch members 6 into frictional engagement with the spoke flanges 13 of the wheel. Obviously the magnitude of the braking force applied to the wheel is dependent upon the force applied to turn back one of the crank arms while the other is held from turning and if desired this force may be continued and increased to such an extent that the wheel may be stopped and positively driven backward.

Upon the removal of the force tending to rotate one of the crank spindles relatively to the other, the natural resiliency of the fork branches 1 causes these to spring apart to their normal positions and carry with them said spindles and cranks, whereupon the clutch members 6 are no longer frictionally pressed against the hub flanges 13 so that the wheel is free to coast or drift and may thereafter be forwardly propelled as above described when the crank arm 4 is turned in a clockwise direction.

From the above description it will be noted that the device is of a simple and substantial nature, inexpensive to make and easy to assemble. It is, moreover, of such a construction that it is not likely to require any but a minimum of attention, nor will it easily get out of order, being peculiarly adapted for use in connection with children's vehicles which demand a rugged substantial arrangement capable of continuing in operative condition for long periods of time.

In order to prevent sudden gripping of the parts 6 and 13 and to insure the gradual application of the braking force to the wheel, I may if desired provide annular grooves in the adjacent faces of each of the flanges of the members 6 and of its coacting hub flange 13,—placing in each of these grooves a floating brake ring 20. As a result of this construction there is no danger of the clutch elements immovably gripping the hub flanges or of their alternately gripping and releasing them as might otherwise occur.

I claim:

1. The combination in a coaster brake of a fork; a crank shaft; cranks having tubular spindles journaled in said fork and free to turn as well as slide longitudinally on said shaft; a wheel hub; braking means therefor actuated by relative longitudinal movement of the spindles on the crank shaft.

2. The combination in a coaster brake of a fork; a crank shaft; cranks having tubular spindles journaled in said fork and free to turn as well as slide longitudinally on said shaft; a wheel hub; a braking member cooperative with the hub; and means actuated by relative movement of the crank spindles for causing said member to retard movement of the hub.

3. The combination in a coaster brake of a fork; a crank shaft; cranks having tubular spindles journaled in said fork and free to turn as well as slide longitudinally on said shaft; a wheel hub; a clutch for connecting the hub and the spindles when the latter are turned in one direction; and means for causing a portion of the clutch to act as a brake for the hub when one of the spindles is turned relatively to the other.

4. The combination in a coaster brake of a fork; tubular spindles journaled in said fork; cranks respectively connected to said spindles; a crank shaft extending through the tubular spindles and having cams thereon for causing movement of said spindles toward each other when they are turned relatively to the shaft; a hub mounted to rotate on the shaft; clutching means for connecting the spindles to the hub when the cranks are turned in one direction; with braking means operative on the hub and actuated by relative longitudinal movement of the crank spindles.

5. The combination in a coaster brake of a fork; tubular spindles journaled in said fork; cranks respectively connected to said spindles; a crank shaft extending through the tubular spindles and having cams thereon for causing movement of said spindles toward each other when they are turned relatively to the shaft; a hub mounted to rotate on the shaft; with means for utilizing the resiliency of the fork to release the braking means.

6. The combination in a coaster brake of a fork; cranks having tubular spindles journaled therein; a crank shaft having cams on its ends coacting with the crank spindles to cause their relative longitudinal movement when one of them is turned relatively to other; a hub on the crank shaft; and two clutches operative on the sides of the hub to connect the same to the crank spindles when the cranks are turned in one direction.

7. The combination in a coaster brake of a fork; cranks having tubular spindles journaled in the branches of said fork; a crank shaft extending through said spindles; a hub rotatably mounted on the crank shaft; clutch members fixed to the crank spindles; other clutch members connected to the hub and formed to clutch said first members respectively when the cranks are turned in one direction; and means for causing the crank spindles to move together to cause the first clutch members to retard rotation of the hub when one of the cranks is turned on the shaft relatively to the other.

8. The combination in a coaster brake of a fork; cranks having tubular spindles journaled in the branches of said fork; a crank shaft extending through said spindles; a hub rotatably mounted on the crank shaft; clutch members fixed to the crank spindles; other clutch members connected to the hub and formed to clutch said first members respectively when the cranks are turned in one direction; means for causing the crank spindles to move together to cause the first clutch members to retard rotation of the hub when one of the cranks is turned on the shaft relatively to the other; and means for causing the branches of the forks to oppose movement together of the crank spindles.

9. The combination in a coaster brake of a fork; cranks having tubular spindles rotatably mounted in the branches of the fork and formed with shoulders adjacent the outer sides of said branches; clutch members rotatably fixed to the crank spindles; a crank shaft extending through the spindles and having cams on its ends cooperative with the spindles for causing them to move longitudinally on said shaft when one of them is turned relatively to the other; a wheel hub mounted on the shaft between the clutch members and having flanges cooperating with said members to form braking means; with elements for connecting said clutch members respectively to the hub when the cranks are turned in one direction.

10. The combination in a coaster brake of a fork; cranks having tubular spindles rotatably mounted in the branches of the fork and formed with shoulders adjacent the outer sides of said branches; clutch members rotatably fixed to the crank spindles; a crank shaft extending through the spindles and having cams on its end cooperative with the spindles for causing them to move longitudinally on said shaft when one of them is turned relatively to the other; a wheel hub mounted on the shaft between the clutch members and having flanges cooperating with said members to form braking means; with elements for connecting said clutch members respectively to the hub when the cranks are turned in one direction, the branches of the fork cooperating with the shoulders of the crank spindles to move the clutch members away from the hub flanges after they have been forced into braking engagement therewith.

11. The combination in a coaster brake of a fork; a crank shaft; cranks having tubular spindles journaled in said fork and free to turn as well as slide longitudinally on said shaft; a wheel hub; a clutch including a member mounted adjacent said hub; and a floating braking ring mounted between said member and the wheel hub for frictionally connecting the hub and said member when the spindles are moved longitudinally on the crank shaft.

12. The combination in a coaster brake of a fork; a crank shaft; cranks having tubular spindles journaled in said fork and free to turn as well as slide longitudinally on said shaft; a wheel hub; with braking means including a member movable toward the hub by relative longitudinal movement of the spindles on the shaft and including a floating ring between said member and said hub.

CLARENCE M. DAVIS.